(12) United States Patent
Wieres et al.

(10) Patent No.: US 7,666,521 B2
(45) Date of Patent: Feb. 23, 2010

(54) HONEYCOMB BODY FOR AN EXHAUST GAS TREATMENT UNIT

(75) Inventors: Ludwig Wieres, Overath (DE); Alexander Scholz, Bonn (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 12/118,770

(22) Filed: May 12, 2008

(65) Prior Publication Data

US 2008/0261068 A1    Oct. 23, 2008

Related U.S. Application Data

(63) Continuation of application No. PCT/EP2006/010788, filed on Nov. 10, 2006.

(30) Foreign Application Priority Data

Nov. 11, 2005 (DE) ................ 10 2005 054 310

(51) Int. Cl.
*B32B 3/12* (2006.01)
*B01J 35/04* (2006.01)
*F01N 3/28* (2006.01)

(52) U.S. Cl. .......... 428/593; 428/586; 428/600; 228/181; 228/118; 29/890; 502/439; 502/527.22; 422/179; 422/180

(58) Field of Classification Search .......... None
See application file for complete search history.

(56) References Cited

U.S. PATENT DOCUMENTS

| | | | | |
|---|---|---|---|---|
| 3,623,921 A * | 11/1971 | Behringer | ..................... | 148/22 |
| 4,396,213 A * | 8/1983 | Hawkins | .................. | 285/289.3 |
| 4,439,250 A * | 3/1984 | Acharya et al. | ............... | 148/23 |
| 4,451,540 A * | 5/1984 | Baird et al. | .................. | 428/615 |
| 6,460,754 B1 * | 10/2002 | Messelling et al. | .......... | 228/214 |
| 6,634,542 B1 | 10/2003 | Wieres | | |
| 6,673,466 B2 | 1/2004 | Brück et al. | | |
| 2004/0152594 A1 * | 8/2004 | Bruck et al. | ................. | 502/439 |
| 2005/0106084 A1 | 5/2005 | Maus et al. | | |
| 2005/0186127 A1 | 8/2005 | Reck et al. | | |

FOREIGN PATENT DOCUMENTS

| WO | 99/37896 A1 | 7/1999 |
|---|---|---|
| WO | 01/79669 A1 | 10/2001 |
| WO | 03/087548 A1 | 10/2003 |
| WO | 2004/037394 A1 | 5/2004 |

OTHER PUBLICATIONS

International Search Report, dated Feb. 1, 2007.

* cited by examiner

*Primary Examiner*—John J Zimmerman
(74) *Attorney, Agent, or Firm*—Laurence A. Greenberg; Werner H. Stemer; Ralph E. Locher

(57) ABSTRACT

A honeycomb body for an exhaust treatment unit has at least one honeycomb structure and a least one housing, which at least partially surrounds the at least one honeycomb structure. At least one region between the honeycomb structure and the housing is formed with a brazed joint and at least two separate measures delimit the brazed joint. Furthermore, a method for producing a corresponding honeycomb is also proposed.

8 Claims, 1 Drawing Sheet

HONEYCOMB BODY FOR AN EXHAUST GAS TREATMENT UNIT

CROSS-REFERENCE TO RELATED APPLICATIONS

This is a continuation, under 35 U.S.C. § 120, of copending international application No. PCT/EP2006/010788, filed Nov. 10, 2006, which designated the United States; this application also claims the priority, under 35 U.S.C. § 119, of German application DE 10 2005 054 310.3, filed Nov. 11, 2005; the prior applications are herewith incorporated by reference in their entirety.

BACKGROUND OF THE INVENTION

Field of the Invention

The present invention relates to a honeycomb body for an exhaust gas treatment unit which contains at least one honeycomb structure and at least one housing which at least partially surrounds the at least one honeycomb structure. The present invention relates in particular to the formation of a brazed joint between the honeycomb structure and the housing. Such honeycomb bodies are often used to clean exhaust gases in motor vehicles.

Such honeycomb bodies generally have a metallic or ceramic honeycomb structure. Even if the following aspects are often also applicable to ceramic honeycomb structures, here in particular a metallic honeycomb structure, which is secured on or in the housing by a brazed joint, is considered. The formation of specific brazed joints is of particular significance for ensuring a permanent connection between the honeycomb structure and housing. This results from the fact that both components exhibit different thermal and dynamic behaviors in exhaust gas systems of mobile or stationary internal combustion engines. For a certain relative movement of the honeycomb structure and housing with respect to one another it is desirable for the two components only to be brazed to one another partially, that is to say not over the entire lateral surface or contact surface.

Basically, a large number of possibilities for how and at what locations brazing material is to be applied and a brazed joint is to be generated have already been described. However, in this context, insufficient consideration has been given until now to the fact that, particularly during the brazing process itself or even already during the assembly of the honeycomb body or the subsequent storing transportation, states may be present which cause the brazed joints ultimately to extend beyond the desired region. Such extension of the brazed joints beyond the desired region gives rise to a changed thermal expansion behavior of the honeycomb body, which under certain circumstances can lead to malfunctions of the honeycomb body.

BRIEF SUMMARY OF THE INVENTION

It is accordingly an object of the invention to provide a honeycomb body for an exhaust gas treatment unit which overcome the above-mentioned disadvantages of the prior art devices and method of this general type. In particular, the intention is to specify a honeycomb body which ensures precisely delimited brazed joints even within the scope of series fabrication. Furthermore, a method for manufacturing a honeycomb body is also to be specified in which brazed joints which are delimited in such a precise fashion are obtained.

The honeycomb body according to the invention for an exhaust gas treatment unit has at least one honeycomb structure and at least one housing which at least partially surrounds the at least one honeycomb structure. At least one region between the honeycomb structure and the housing is embodied with a brazed joint. In this context, the honeycomb body is distinguished by the fact that at least two measures, which are different from one another, are provided for delimiting the brazed joint.

The honeycomb body serves in particular as a catalyst carrier body, as a filter or as an adsorber or a similar exhaust gas treatment unit for use, for example, in exhaust systems of motor vehicles. A honeycomb body preferably has precisely one honeycomb structure and precisely one housing, with the honeycomb structure preferably being completely enclosed by the housing. The number of regions with brazed joints is to be matched to the respective thermal loading, and in many cases a single region of the contact surface between the honeycomb structure and housing as a region for a brazed joint is to be considered sufficient.

In order to ensure the desired delimiting of the brazed joint, separate measures are then provided, more specifically two measures which are different from one another being used here. These measures are usually arranged at the edge and/or outside the region of the brazed joint. They have the function of preventing an undesired flow of brazing material (for example during the assembly process and/or during the assembly of the honeycomb body). The measures for delimiting the brazed joint quite particularly preferably serve to interrupt a capillary effect for the brazing and/or material for abrasion of the brazing material.

According to one preferred embodiment variant of the honeycomb body, the measures contain at least two from the following group formed of a groove in the housing, a microstructure on the outside of the honeycomb structure, a ceramic coating, and an intermediate layer which is arranged between the honeycomb structure and the housing.

The groove in the housing is preferably of a circumferential configuration, in which case it has, for example, a depth in the range from 0.1 to 0.5 mm and a width in the range from 0.5 to 2.0 mm. The groove preferably has a cross section which corresponds essentially to a semicircle. The groove advantageously lies directly at the edge of the region of the brazed joint. Under certain circumstances it is also appropriate to provide a plurality of grooves, in particular directly adjacent grooves, on one side or on both sides of a region with the brazed joint. In one preferred embodiment variant, precisely one groove is provided for the purpose of delimitation with respect to areas of the honeycomb body which lie further inward.

A microstructure contains, in particular, radially outwardly directed elevations of the honeycomb structure which generate, for example, a continuous or discontinuous line contact with the housing in the circumferential direction of the honeycomb structure. The microstructure can, for example, be applied to or formed on the outside of the lateral surface of the honeycomb structure, but it is also possible to form the microstructure with separate components which are arranged between the honeycomb structure and the housing.

The provision of a ceramic coating, in particular aluminum oxide or similar materials, has the result that brazing material particles do not collect on it and/or that the ceramic coating functions as a type of brazing stop. The ceramic coating can also be part of the honeycomb structure and/or of the housing.

It is also possible for an intermediate layer to be provided between the honeycomb structure and the housing. In this context, the embodiment in which the intermediate layer is a separate component, for example a separate metal foil, is preferred. The metal foil serves as a type of barrier for an undesired flow of brazing material between the honeycomb structure and housing.

According to a further embodiment of the honeycomb body, the honeycomb structure is formed with a plurality of at least partially structured metallic layers which have a material thickness which is less than 80 µm. In particular, the honeycomb structure is constructed with a plurality of smooth and corrugated metal foils which are coiled and/or wound. In this context, the metal foils usually bound a plurality of ducts which run essentially parallel to one another and through which an exhaust gas can flow. The surface of the ducts usually serves as a filter carrier surface and/or catalyst carrier surface. The thickness of the material of the metallic layers or of the metal foils is preferably even less than 50 µm. Such honeycomb structures are introduced with relatively high prestress into the housing so that considerable frictional forces are generated in the process. This then leads to a situation in which when the brazing material has previously been applied in the housing it is not abraded or "shifted" when the honeycomb structure is inserted. In order, nevertheless, to still generate a precisely delimited brazed joint in the desired region, the various measures for delimiting the brazed joint are provided.

Furthermore it is also proposed that a circumferential region of a brazed joint be provided and that the delimiting measures be arranged between this region of a brazed joint and an end face of a honeycomb body. That is to say in other words the at least two measures which are different from one another are arranged on one side of the region of a brazed joint, that is to say a type of double barrier is provided. In this context the embodiment according to which in each case a measure for delimiting the brazed joint is provided in the various parts of the honeycomb body (housing and/or honeycomb structure and/or intermediate layer) is particularly preferred.

According to a further embodiment of the honeycomb body, the at least one region of a brazed joint is arranged closer to a second end face than a first end face, wherein the measure is provided between the first end face and the region. The region is quite particularly preferably embodied essentially adjoining the second end face, wherein the measures which is arranged toward the first end face prevent an undesired flow of brazing material toward the first end face.

According to a further aspect of the invention, a method for manufacturing a honeycomb body is proposed which has at least one honeycomb structure or at least one housing which at least partially surrounds the at least one honeycomb structure. The method includes selecting at least one region of a brazed joint between honeycomb structure and housing, selecting an insertion direction of the honeycomb structure into the housing, forming a groove in the housing which, viewed in the insertion direction, is positioned before the region of a brazed joint, providing a further means for delimiting the brazed joint, applying brazing material to the region, insertion of the honeycomb structure into the housing, and forming a brazed joint in the region.

The measure for delimiting the brazed joint is particularly preferably a ceramic coating which is advantageously applied to the honeycomb structure. The method is particularly preferably applied in the manufacture of the abovementioned inventive honeycomb body, and is aimed, in particular, at the manufacture of a metallic honeycomb body with metallic layers. In particular in the case of the thin metal foils which are used here, the partially undesired capillary effects occur to a greater extent so that new protection measures for avoiding this phenomenon between the housing and honeycomb structure have been applied here in particular.

Other features which are considered as characteristic for the invention are set forth in the appended claims.

Although the invention is illustrated and described herein as embodied in a honeycomb body for an exhaust gas treatment unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
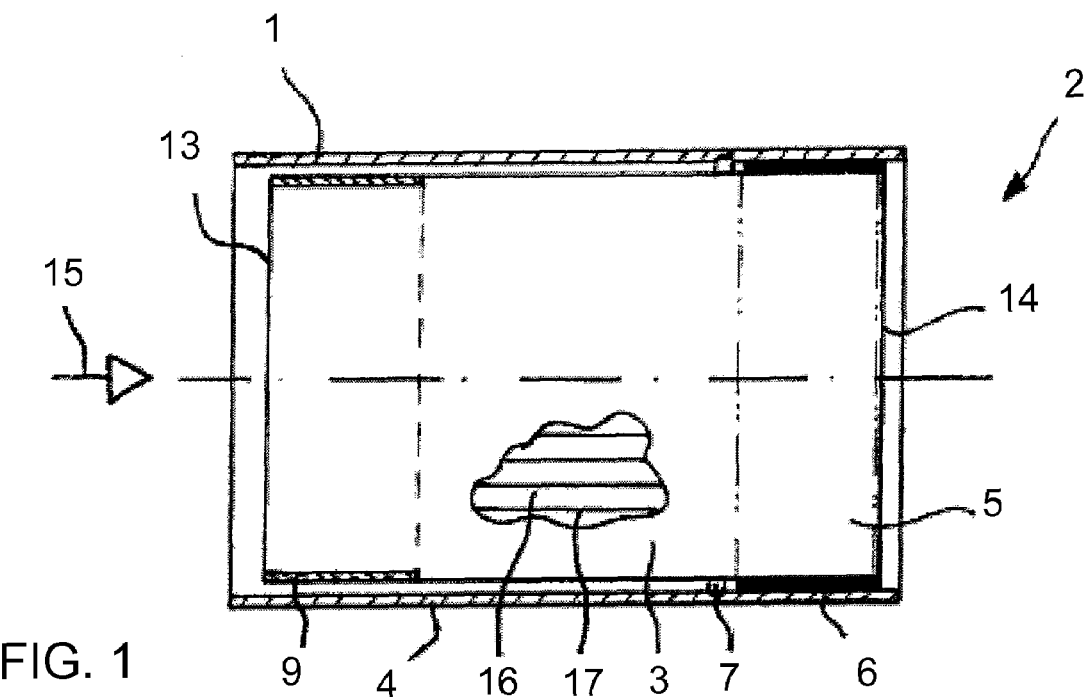
FIG. 1 is a diagrammatic, partial cross-sectional view of a first embodiment variant of a honeycomb body according to the invention.

Referring now to the figures of the drawing in detail and first, particularly, to FIG. 1 thereof, there is shown a schematic illustration of a partial cross section through a honeycomb body 1 for an exhaust gas treatment unit 2. The honeycomb body 1 contains a honeycomb structure 3 and a housing 4 which completely surrounds the honeycomb structure 3. A region 5 for forming a brazed joint 6 is provided between the honeycomb structure 3 and the housing 4. In this context, the region 5 of the brazed joint 6 is positioned closer to a second end face 14 than to a first end face 13. In addition, the honeycomb body 1 has two different measures for delimiting the brazed joint 6, specifically on the one hand a groove 7, which is formed circumferentially in the housing 4, and a ceramic coating 9, which is provided on the outside near to the first end face 13 of the honeycomb structure 3.

In order to manufacture such a honeycomb body 1, first the one region 5 of the brazed joint 6 near to the second end face 14 has been selected. Subsequent to this, it has been decided that the honeycomb body 1 is inserted into the housing 4 in a insertion direction 15 during the assembly process. In order to prevent an undesired flow of brazing material toward the first end face 13 during the thermal treatment of the honeycomb body 1, the circumferential groove 7 has been provided in the housing 4, which groove 7 is positioned, viewed in the insertion direction 15, before the region 5. For the sake of completeness it is also to be noted that, when the region 5 is at a relatively large distance from the second end face 14, the groove 7 can also be provided on the other side, which groove 7 prevents, for example, the undesired entrainment of brazing material during the insertion process.

The honeycomb structure 3 has now been formed with a plurality of at least partially structured metallic foils 17 and at the same time a plurality of ducts 16 which run essentially parallel to one another have been produced. After a strip with brazing material has first been provided in the region 5 on the inside of the housing 4, the honeycomb structure 3 has been inserted into the housing 4 in the insertion direction 15. After the desired relative position with respect to the housing 4 has been reached, the honeycomb body 1 is subjected to thermal treatment so that precisely the desired brazed joint 6 is formed in the region 5. Such a honeycomb body 1 is distinguished by an expected long service life even under high thermal and dynamic stresses in the exhaust system of a motor vehicle.

Figure 2:
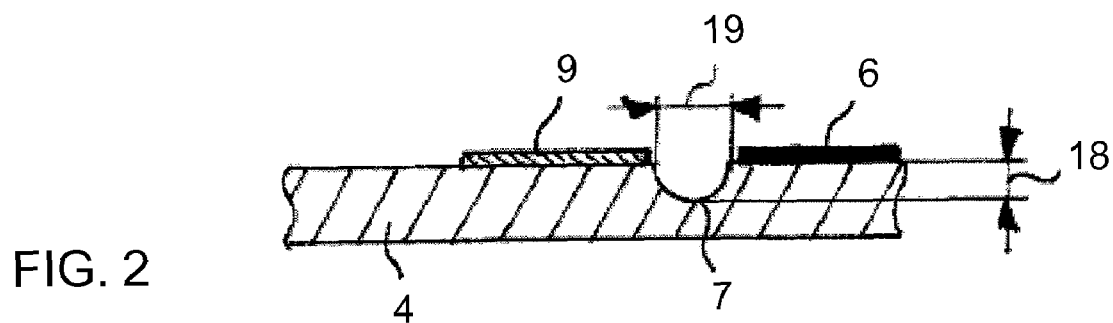
FIG. 2 is a diagrammatic, enlarged, sectional view of a detail of a second embodiment variant of the honeycomb body according to the invention.

FIG. 2 is a schematic view of a detail of a second embodiment variant of the measures for delimiting the brazed joint 6. Again, the groove 7 is formed with a defined width 19 and a predefined depth 18. On one side of the groove 7, the region with the brazed joint 6 is formed, and the ceramic coating 9 is provided on the opposite side, on the housing 4.

Figure 3:
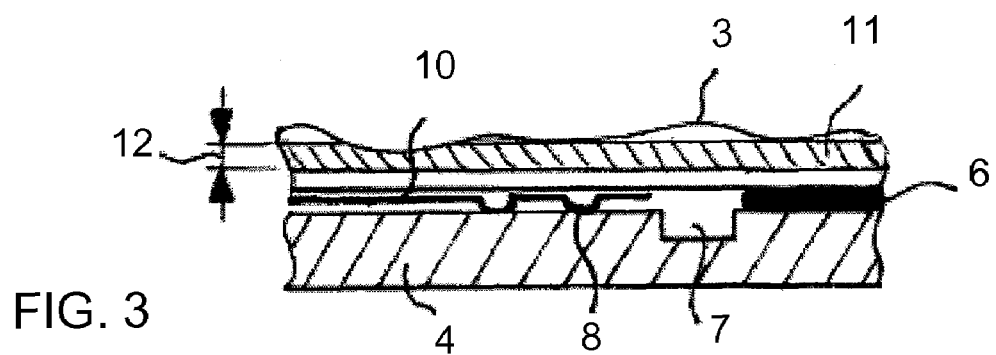
FIG. 3 is a diagrammatic, enlarged, sectional view of a detail of a third embodiment variant of the honeycomb body according to the invention.

FIG. 3 shows a third embodiment variant in which, in addition to the groove 7 in the housing 4, an intermediate layer 10 is provided between the honeycomb structure 3 and the housing 4. The honeycomb structure 3 is formed with metallic layers 11 with a predefined material thickness 12. The intermediate layer 10, which is embodied here as a metal foil with microstructures 8, is also formed between the first end face 13 and the groove 7. The third embodiment variant in which the microstructure 8 of the intermediate layer 10 is embodied so as to be circumferentially parallel to the groove 7 is particularly preferred.

Even if the invention has been explained in the light of the figures, in more detail the invention does not entail conventional modifications of the inventive idea which is shown.

The invention claimed is:

1. A honeycomb body for an exhaust gas treatment unit, the honeycomb body comprising:
   one honeycomb structure having a first end face and a second end face;
   one housing at least partially surrounding said at least one honeycomb structure, said housing directly contacting said honeycomb structure at a contact surface;
   a single brazed joint disposed on a region of said contact surface at said second end face of said honeycomb structure; and
   a groove and a ceramic coating for delimiting said brazed joint, said groove and a ceramic coating being disposed between said first end face and said single brazed joint.

2. The honeycomb body according to claim 1, wherein said honeycomb structure is formed with a plurality of at least partially structured metallic layers which have a material thickness being less than 60 μm.

3. The honeycomb body according to claim 1, wherein:
   said region is a circumferential region.

4. The honeycomb body according to claim 1, wherein said groove has a depth in the range from 0.1 to 0.5 mm and a width in the range from 0.5 to 2.0 mm.

5. The honeycomb body according to claim 1, wherein said ceramic coating is disposed at said first end face.

6. The honeycomb body according to claim 1, wherein said ceramic coating is part of the honeycomb structure.

7. The honeycomb body according to claim 1, wherein said ceramic coating is disposed in a vicinity of said groove.

8. A method for manufacturing a honeycomb body having one honeycomb structure having a first end face and a second end face and one housing at least partially surrounding the one honeycomb structure, which comprises the steps of:
   directly contacting the housing with the honeycomb structure at a contact surface;
   selecting at least one region for a single brazed joint disposed on the contact surface and at the second end face of the honeycomb structure;
   selecting an insertion direction of the honeycomb structure into the housing;
   providing the housing with a groove which when, viewed in the insertion direction, is positioned between the first end and the region for the brazed joint;
   providing a ceramic coating for delimiting the brazed joint disposed between the first end and the region for the brazed joint;
   applying brazing material to the region;
   inserting the honeycomb structure into the housing; and
   forming the brazed joint in the region.

* * * * *